(12) United States Patent
Nurmi

(10) Patent No.: US 9,342,106 B2
(45) Date of Patent: May 17, 2016

(54) APPARATUS AND METHOD FOR ACCESSING COMPONENTS IN A FOLDED DEVICE

(71) Applicant: Nokia Corporation, Espoo (FI)

(72) Inventor: Juha H-P Nurmi, Salo (FI)

(73) Assignee: NOKIA CORPORATION, Espoo (FI)

( * ) Notice: Subject to any disclaimer, the term of this patent is extended or adjusted under 35 U.S.C. 154(b) by 249 days.

(21) Appl. No.: 13/910,649

(22) Filed: Jun. 5, 2013

(65) Prior Publication Data

US 2014/0362513 A1 Dec. 11, 2014

(51) Int. Cl.
*H05K 5/02* (2006.01)
*G06F 1/16* (2006.01)

(52) U.S. Cl.
CPC ............ *G06F 1/1652* (2013.01); *G06F 1/1656* (2013.01); *Y10T 29/49716* (2015.01)

(58) Field of Classification Search
CPC ................ G06F 1/1652; G06F 1/1641; G06F 2203/04102; G06F 1/1616; G06F 1/1647; G06F 3/0412; G06F 3/0416; G06F 3/041; G06F 1/1681; G06F 1/1601; G06F 1/1677; G06F 3/0487; G06F 1/1615; G06F 1/1626; G06F 1/1637; G06F 1/181; G06F 3/0414; G06F 3/147; G06F 3/167; G06F 1/1656; H05K 1/028; H05K 5/0017; H05K 1/0281; H05K 2201/10128; H05K 1/0278; H05K 1/0353; H05K 1/189; H05K 2201/0137; H05K 2201/05; H05K 3/28; H05K 3/30; H05K 7/00; H05K 7/20954; H05K 9/0067; Y10T 29/49716

USPC ............ 361/679.01, 679.02, 679.26, 679.27, 361/679.09, 679.55–679.58; 345/173; 455/575.1–575.4; 248/917–924; 29/401.1

See application file for complete search history.

(56) References Cited

U.S. PATENT DOCUMENTS

| 6,577,496 | B1 * | 6/2003 | Gioscia et al. ............. 361/679.3 |
| 7,714,801 | B2 | 5/2010 | Kimmel |
| 8,787,016 | B2 * | 7/2014 | Rothkopf et al. ........ 361/679.55 |
| 8,804,324 | B2 * | 8/2014 | Bohn et al. ............... 361/679.27 |
| 2012/0002360 | A1 | 1/2012 | Seo et al. |
| 2012/0314399 | A1 | 12/2012 | Bohn et al. |
| 2013/0010405 | A1 | 1/2013 | Rothkopf et al. |
| 2013/0321987 | A1 | 12/2013 | Ore et al. |

FOREIGN PATENT DOCUMENTS

| EP | 1667409 | 6/2006 |
| EP | 2728434 | 5/2014 |

OTHER PUBLICATIONS

Aug. 13, 2014, International Search Report and Written Opinion dated Aug. 13, 2014 for PCT Application No. PCT/FI2014/050405, 15 pages.

* cited by examiner

*Primary Examiner* — Anthony Haughton
*Assistant Examiner* — Ingrid Wright
(74) *Attorney, Agent, or Firm* — Hollingsworth Davis, LLC

(57) ABSTRACT

An apparatus comprises a foldable body and a flexible cover coupled to the foldable body. A first edge of the cover is configured to slide from a first position on the foldable body to a second position on the foldable body while transitioning to a folded configuration.

20 Claims, 9 Drawing Sheets

APPARATUS AND METHOD FOR ACCESSING COMPONENTS IN A FOLDED DEVICE

TECHNICAL FIELD

The present specification relates to mobile device covers, and more specifically, to flexible covers that facilitate accessing components of a mobile device in a folded position.

BACKGROUND

Mobile devices are produced in a variety of shapes and sizes. Certain device configurations allow for the device to fold into a closed position. These devices are primarily used in an open, larger configuration and then folded for storage and/or transport. The typical example is a clamshell-style phone that is substantially flat in the open position and folded in half in the closed position. Similarly, tablet and phablet devices typically have foldable configurations.

While folding the device over upon itself protects the interior, adjacent surfaces, the opposing, exterior side of the device is exposed. Thus, foldable devices include protective covers for the folded, exterior surface. These flexible covers can be added as an accessory after purchase of the device, or they can be fixedly attached during manufacture of the device. Although a flexible cover can protect the device from exterior forces and damage, some covers also prevent light and/or signals from reaching the device circuitry. Thus, in a closed configuration, the functionality of internal components of a device is impaired.

SUMMARY

The present specification discloses an apparatus and method for accessing components in a folded device.

One embodiment of the disclosure is directed to an apparatus comprising a foldable body and a flexible cover coupled to the foldable body. A first edge of the cover is configured to slide from a first position on the foldable body to a second position on the foldable body while transitioning to a folded configuration.

Another embodiment is directed to an apparatus comprising a foldable body comprising at least one component and a flexible display coupled to a first side of the foldable body. A first edge of the display is configured to slide from a first position on the foldable body to a second position on the foldable body while transitioning to a folded configuration. The first edge of the display is also configured to provide access to the at least one component to operate unencumbered when the foldable body is in the folded configuration. The first side of the foldable body is the exterior of the apparatus in the folded configuration.

A further embodiment is directed to a method. The method includes providing a flexible cover on a foldable apparatus and folding the apparatus to a folded configuration. The method further includes sliding at least a first portion of the cover from a first position on the apparatus to a second position on the apparatus. The first portion of the cover, when in the second position, provides access to at least one component of the apparatus.

The above summary is not intended to describe each disclosed embodiment or every implementation. For a better understanding of variations and advantages, reference should be made to the drawings which form a further part hereof, and to accompanying descriptive matter, which illustrate and describe representative embodiments.

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the invention.

Mobile devices comprise numerous parts. In addition to the fundamental elements such as processors and memory, mobile devices include elements for interacting with other devices or a user. For example, audio components include a microphone that converts acoustic signals to an electronic format and a speaker that converts the electrical format to acoustic signals. A transceiver receives and transmits radio waves to generate internal electrical control signals. Also, a camera generates images based on different levels of light received from an object. Each of these components, and others (e.g., antennas, ambient light sensors), receive or transmit signals as part of their operability.

The reception and transmission of signals by these components can have a directional component. For example, a component may receive signals from one side of a device, if the other side is blocked by either the materials comprising that side of the device or another blocking element. The direction in which a component receives or transmits signals is called a working direction. The working direction can be determined by the device configuration.

These device components are typically used by a user when the mobile device is in an operating, or open, position/configuration. An open position involves available access, both physical and electrical, to the components for operation—the components operate unencumbered. For example, the components readily receive and transmit signals absent significant barriers. In a foldable device, an open position involves the device being substantially flat, with substantially maximum surface area available for user interaction.

A closed position/configuration is substantially the opposite. The device is folded over, at least in part, upon itself, and the device is not actively used by the user. A closed configuration is typically utilized for storage or transport of the device. Because the closed configuration presents barriers to the internal components, through the folded portions of the device and/or a protective external cover/surface, performance/operability of the components deteriorates or is impaired (e.g., the working direction is blocked). Embodiments of the disclosure provide a slidable cover that exposes the components to provide access to them when a mobile device is in an open, or closed, configuration.

Figure 1A:
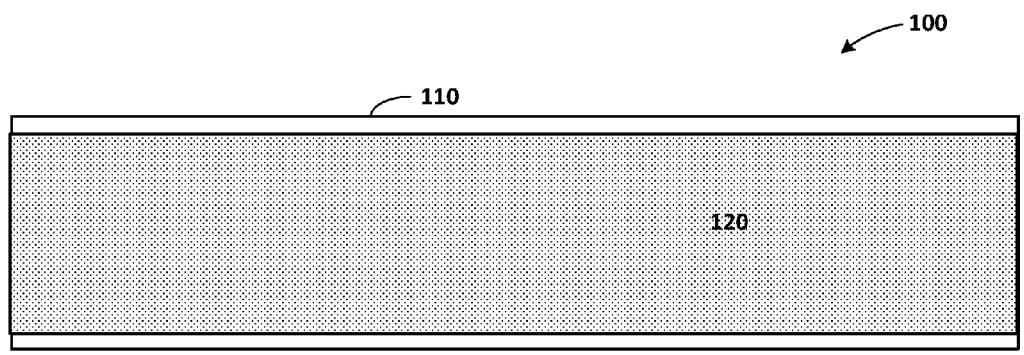
FIG. 1A is top view of a mobile device in an unfolded position, according to example embodiments.

FIGS. 1A-D illustrate a foldable mobile device 100 in accordance with various embodiments. FIG. 1A is a top view of the mobile device 100 in an open configuration. The device 100 includes a device body 110 and a flexible cover 120. While cover 120 is shown corresponding to the length of the device body 110 and having a smaller width than device body 110, the cover 120 can come in a variety of dimensions. For example, the cover 120 can correspond to the entire top surface of device body 110, or can have shorter or longer length and/or width dimensions.

Figure 1B:
FIG. 1B is side view of a mobile device in an unfolded position, according to example embodiments.

FIG. 1B shows a side view of the mobile device 100 of FIG. 1A, also in the open position. In this open configuration, device 100 is typically in use by a user. In certain embodiments, the user interface surface of device 100 is the surface with cover 120. Thus, cover 120 is also a user interface. For example, cover 120 can be a display and/or a touchscreen. Since cover 120 is flexible, the cover and/or touchscreen are flexible. This flexibility is further illustrated in FIGS. 1C-D.

Figure 1C:
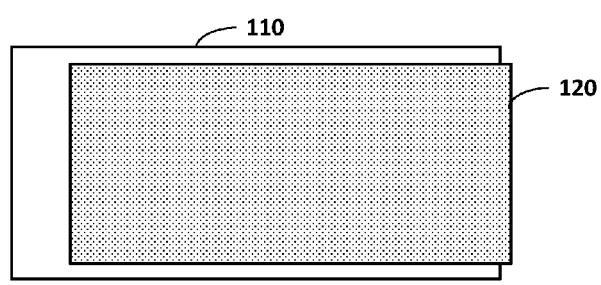
FIG. 1C is top view of a mobile device in a folded position, according to example embodiments.

Similar to FIG. 1A, FIG. 1C illustrates a top view of the mobile device 100, although in a closed (folded) configuration. The closed configuration involves folding mobile device 100. While device 100 is shown folded in half, any number of folds, in a variety of locations are possible. The fold can be accomplished with a variety of mechanical or material approaches. For example, the fold can occur at one or more hinges built into device 100. Alternatively, today's flexible, expandable electronic materials provide for bendable, foldable displays and devices. Thus, the entire device body can fold over onto itself without a designated hinge point. In addition to being flexible, cover 120 is also displaceable, which is further illustrated in FIG. 1D.

Figure 1D:
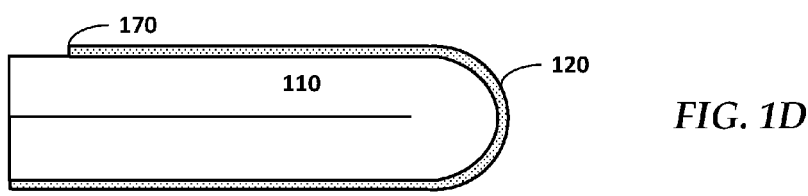
FIG. 1D is side view of a mobile device in a folded position, according to example embodiments.

FIG. 1D is a side view of the mobile device 100 of FIG. 1C in the folded configuration. To accommodate the increased exterior surface of the device 100 in the folded position, cover 120 is displaced at one end of the device 100. As shown, one end of cover 120 moves to a second location 170 on the device body 110. The cover can be moved in a variety of ways, e.g., by sliding along the device body to position 170 or by detaching and reattaching the cover 120 at the second position 170. When the cover 120 is displaced by sliding, the displacement can occur automatically with the folding of the device 100. The folding action expands the surface area of the body 110, pulling the cover 120 over and along the body 110 from one end while the opposing end remains fixed in place. The sliding of the cover can be facilitated with grooves, or tracks, in the device body 110.

In addition, a locking device, such as a notch, can secure the cover 120 at the second position 170. The locking device can automatically engage depending on how the device 100 is folded or which applications are activated. Also, the locking of cover 120 can be user selectable and/or dependent upon the folding position. For example, based upon whether a user is left or right handed, the user may select differing ends, or both, of cover 120 to slide and/or lock. If the device 100 has a plurality of foldable positions, the cover 120 can also have a plurality of corresponding slidable positions that can be user selectable. For example, the user can also select which portion of cover 120 remains fixed, which then determines which portions of the cover are slidable. In further embodiments, more than one portion of the cover 120 is displaceable.

Figure 2A:
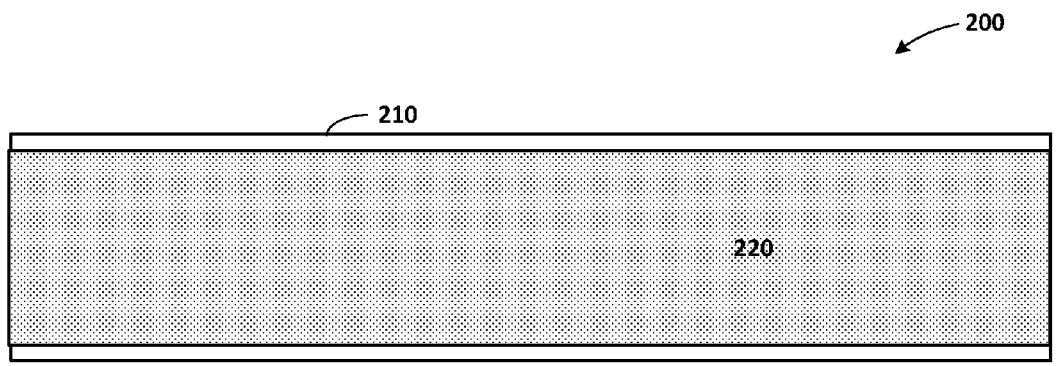
FIG. 2A is top view of a mobile device in an unfolded position, according to example embodiments.

FIGS. 2A-D illustrate a foldable mobile device 200 in accordance with various embodiments. FIG. 2A is a top view of the mobile device 200 in an open configuration similar to mobile device 100. The device 200 includes a device body 210 and a flexible cover 220. While cover 220 is shown corresponding to the length of the device body 210 and having a smaller width than device body 210, the cover 220 can come in a variety of dimensions. For example, the cover 220 can correspond to the entire top surface of device body 210, or can have shorter or longer length and/or width dimensions.

Figure 2B:
FIG. 2B is side view of a mobile device in an unfolded position, according to example embodiments.

FIG. 2B shows a side view of the mobile device 200 of FIG. 2A, also in the open position. The user interface surface of device 200 is the cover 220—cover 220 is also a user interface. For example, cover 220 can be a display and/or a touchscreen. Since cover 220 is flexible, the cover and/or touchscreen are flexible. This flexibility is further illustrated in FIGS. 2C-D.

Figure 2C:
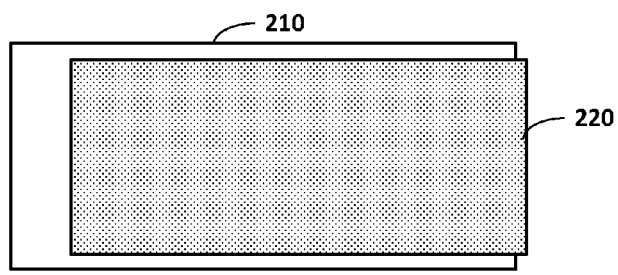
FIG. 2C is top view of a mobile device in a folded position, according to example embodiments.

Similar to FIG. 2A, FIG. 2C illustrates a top view of the mobile device 200, although in a closed (folded) configuration. The closed configuration involves folding mobile device 200. The fold can be accomplished with a variety of mechanical or material approaches. For example, the fold can occur at one or more hinges built into device 200. Alternatively, today's flexible, expandable electronic materials provide for bendable, foldable displays and devices. Thus, the entire device body can fold over onto itself without a designated hinge point. In addition to being flexible, cover 220 is also displaceable, which is further illustrated in FIG. 2D.

Figure 2D:
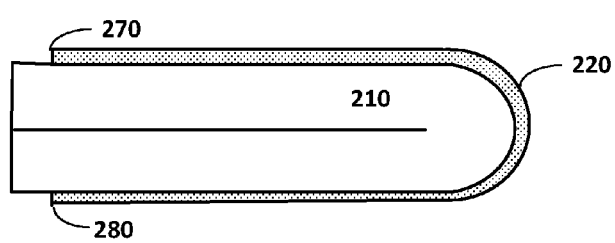
FIG. 2D is side view of a mobile device in a folded position, according to example embodiments.

FIG. 2D is a side view of the mobile device 200 of FIG. 2C in the folded configuration. To accommodate the increased exterior surface of the device 200 in the folded position, cover 220 is displaced at both ends of the device 200. As shown, a first end of cover 220 moves to a second location 270 on the device body 210. Also, a second end of cover 220 moves to a secondary location 280 on the device body 210. The two ends of cover 220 are displaceable while an intermediate portion of the cover 220 remains fixed in place. While locations 270 and 280 are illustrated as opposing each other, such that cover 220 slides an equal amount on both halves of folded device 200, locations 270 and 280 can be offset. Cover 220 does not necessarily slide the same distance on each portion/half of body 210. The uncovered, exposed portion(s) of device body 210 can provide further benefits for device 200 functionality, as discussed further below.

Figure 3:
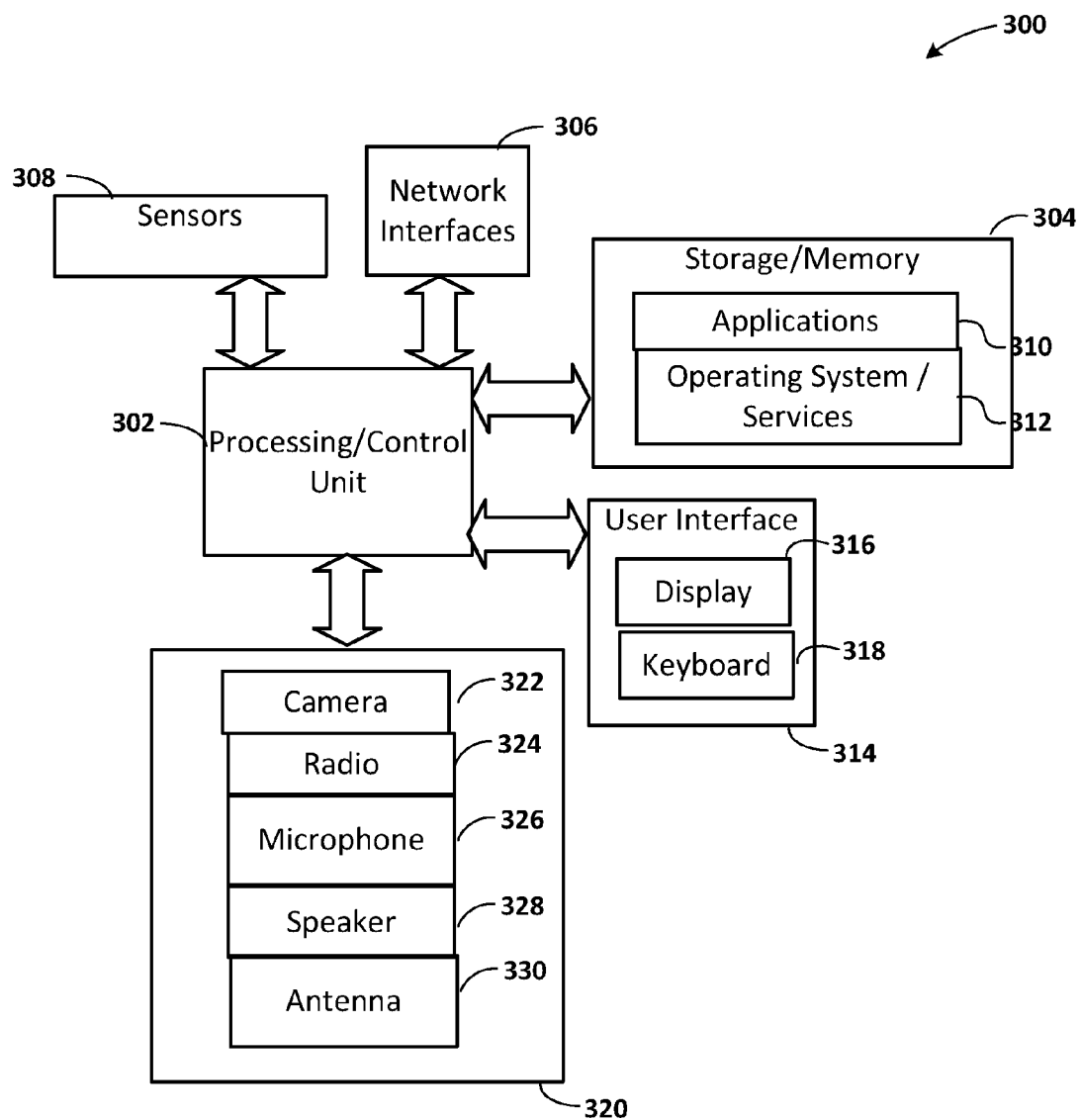
FIG. 3 is a block diagram of an apparatus, according to an example embodiment.

In reference now to FIG. 3, a block diagram illustrates an apparatus that includes a flexible cover according to an example embodiment. The user apparatus 300 of FIG. 3 is a representative example of a mobile device, although it will be understood that similar features may be implemented in a variety of mobile and non-mobile devices. The apparatus 300 may include, for example, a mobile apparatus, mobile phone, mobile communication device, mobile computer, laptop computer, desktop computer, server, phone device, video phone, conference phone, television apparatus, digital video recorder (DVR), set-top box (STB), radio apparatus, audio/video player, game device, positioning device, digital camera/camcorder, and/or the like, or any combination thereof.

The processing unit 302 controls the basic functions of the apparatus 300. Those functions may be configured as instructions (e.g., software, firmware) stored in a program storage/memory 304. The instructions may be provided via computer program product, computer-readable medium, and/or be transmitted to the mobile apparatus 300 via data signals (e.g., downloaded electronically via one or more networks, such as the Internet and intermediate wireless networks). In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer The mobile apparatus 300 may include hardware and software components coupled to the processing/control unit 302. The mobile apparatus 300 includes one or more network interfaces 306 for maintaining any combination of wired or wireless data connections. These network interfaces 306 enable the apparatus 300 to directly communicate with other devices, and/or join in one or more communication networks.

The processor 302 is also coupled to user-interface hardware 314 associated with the apparatus. The user-interface 314 may include a display 316, such as a light-emitting diode (LED) and/or liquid crystal display (LCD) device. The user-interface hardware 314 also may include an input device capable of receiving user inputs. This may be integrated with the display 316 (e.g., touchscreen) and/or include dedicated hardware switches (e.g., keyboard 318). These and other user-interface components are coupled to the processor 302 as is known in the art.

The mobile apparatus 300 also includes sensors 308 coupled to the processing/control unit 302. These sensors 308 may include a capacitive proximity sensor, an orientation/location sensor, an ambient light sensor, and a temperature sensor. The sensors 308 are used to determine/establish context for the mobile apparatus 300. These and other sensing devices are coupled to the processor 302 as is known in the art.

Various functional components 320 can also be included in the apparatus. Such components can include any combination of one or more, camera(s) 322, radio(s) 324, microphone(s) 326, speaker(s) 328, and antenna(s) 330. To function, each of the sensors 308 and components 320 utilize external signals. For example, light sensors 308 and camera 322 receive light to generate images. Radio 324 and antenna 330 send and receive radio, and other electromagnetic, signals. While microphone 326 receives acoustic signals, and speaker 328 transmits acoustic signals. These and other functional components 320 are coupled to the processor 302 as is known in the art.

The program storage/memory 304 includes operating systems 312 for carrying out functions and applications 310 associated with functions on the mobile apparatus 300. The program storage 304 may include one or more of read-only memory (ROM), flash ROM, programmable and/or erasable ROM, random access memory (RAM), subscriber interface module (SIM), wireless interface module (WIM), smart card, hard drive, computer program product, and removable memory device. The storage/memory 304 may also include interface modules such as operating system drivers, middleware, hardware abstraction layers, protocol stacks, and other software that facilitates accessing hardware such as user interface 314, sensors 308, network hardware 306, and components 320.

Figure 4:
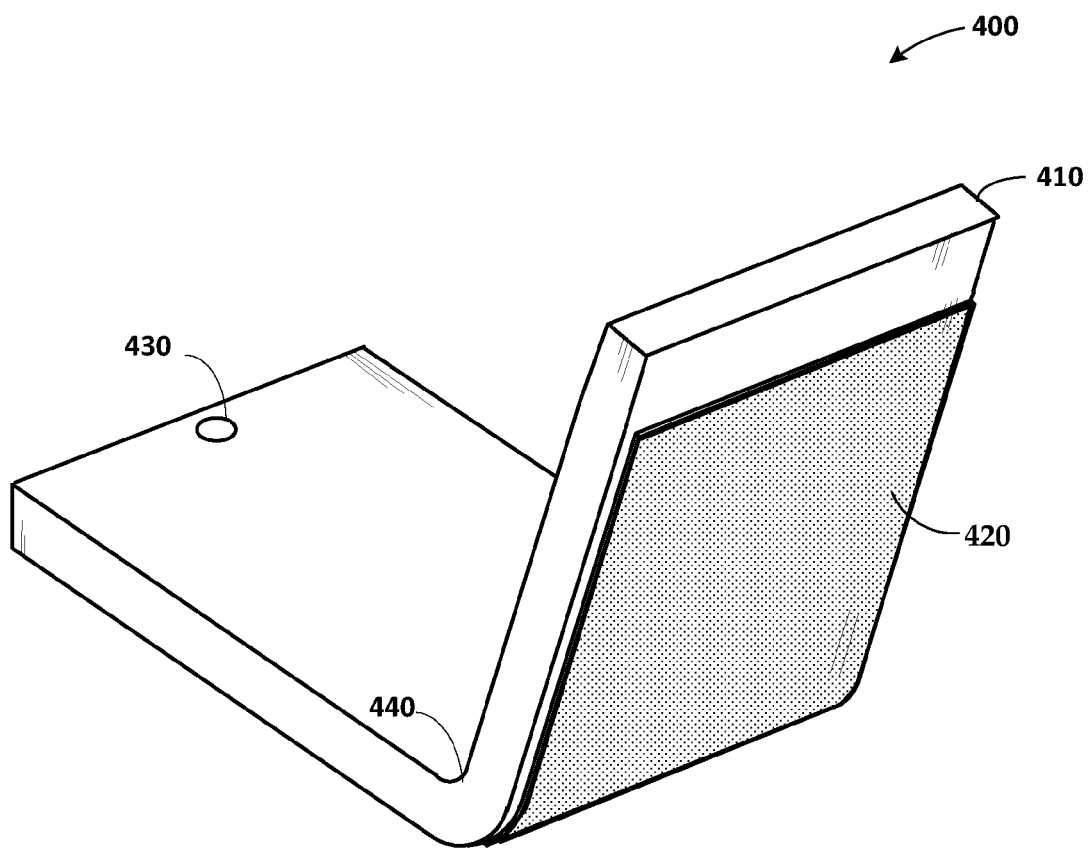
FIG. 4 is a perspective view of a mobile device transitioning to a folded configuration, according to example embodiments.

The folding of a mobile device 400 is further illustrated in the perspective view of FIG. 4. Device 400 includes a device body 410 and a cover 420 coupled to the folded, exterior surface of the folding body 410. Device 400 is folded in half around a fold axis 440. This can be accomplished with a variety of hinges. Alternatively, fold axis 440 can be a designed portion of device body 410 comprising flexible materials, such as plastics or metals, that enable folding at that location. As device 400 is folded, cover 420 is pulled/slid away from the edge of device body 410. As discussed above, the opposing end (not shown) may also be sliding during the folding of the device 400.

FIG. 4 also identifies access to a device component 430, such as a camera. While component 430 is accessible/functional when device 400 is in an open configuration, access to the component 430 is folded into the device 400 when the device 400 is in a closed configuration. Thus, the folded configuration blocks access to component 430. Cover 420 would also block signal access to component 430. For example, cover 420 blocks light when cover 420 is not transparent. Also, when cover 420 is a display and/or touchscreen involving conductive material, cover 420 creates a shield against electromagnetic signals. In order to enable functionality for component 430 when device 400 is in a closed configuration, cover 420 is displaced. Various embodiments of this displacement are addressed in the following figures.

Figure 5A:
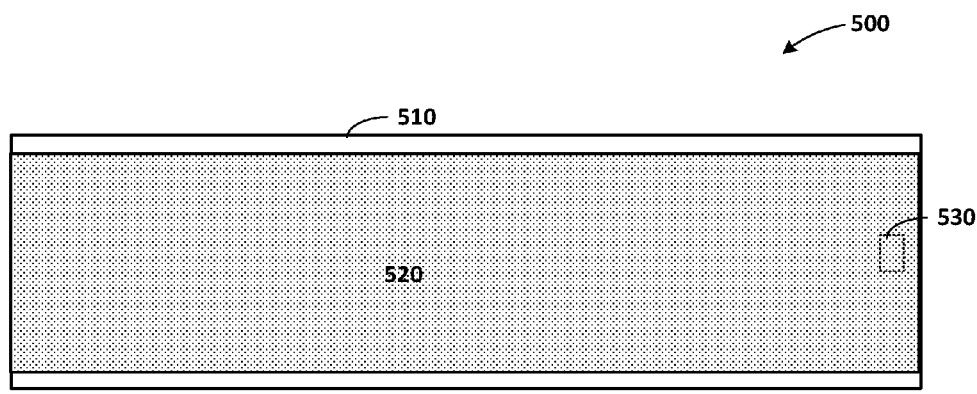
FIG. 5A is top view of a mobile device in an unfolded position, according to example embodiments.

FIGS. 5A-D illustrate a foldable mobile device 500 in accordance with various embodiments. FIG. 5A is a top view of the mobile device 500 in an open configuration. The device 500 includes a device body 510 and a flexible cover 520. The device body 510 also contains a component 530 at one end of the device 500.

Figure 5B:
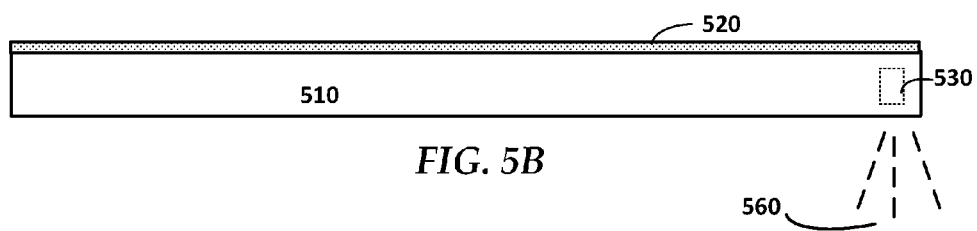
FIG. 5B is side view of a mobile device in an unfolded position, according to example embodiments.

FIG. 5B shows a side view of the mobile device 500 of FIG. 5A, also in the open position. In certain embodiments, the user interface surface of device 500 is the cover 520—cover 520 is also a user interface. For example, cover 520 can be a display and/or a touchscreen. As a touchscreen or display, cover 520 includes layers of conductive material that does not allow light, or other electromagnetic signals to penetrate.

Thus, functionality of component 530 is facilitated through the opposing side of device 500 to provide a first signal access route 560. The working direction of component 530 is away from cover 520.

Figure 5C:
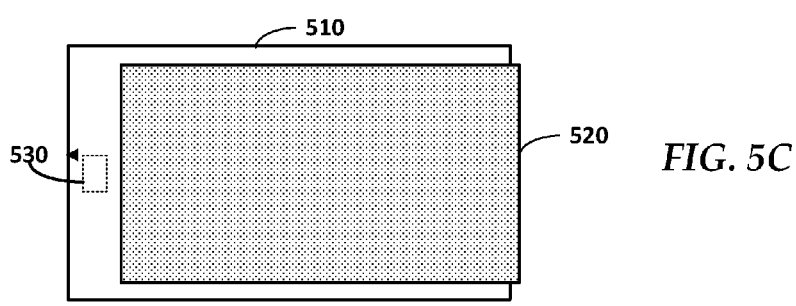
FIG. 5C is top view of a mobile device in a folded position, according to example embodiments.

Similar to FIG. 5A, FIG. 5C illustrates a top view of the mobile device 500, although in a closed (folded) configuration. The closed configuration involves folding mobile device 500. As discussed above device 500 can be folded using a variety of techniques and locations. In this top view, the location of component 530 is shown. However, component 530 is located in the bottom portion of the folded device 500. To provide access, either physical access for a user or electronic access for various signals, to component 530, cover 520 is removed to expose the location of the component 530.

Figure 5D:
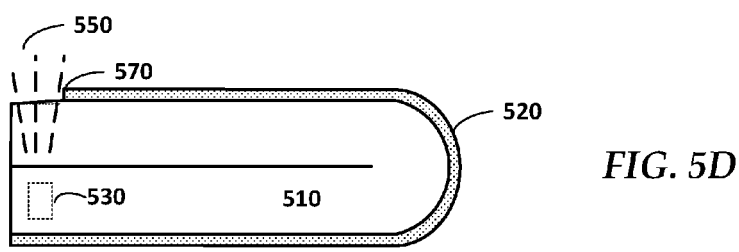
FIG. 5D is side view of a mobile device in a folded position, according to example embodiments.

FIG. 5D is a side view of the mobile device 500 of FIG. 5C in the folded configuration illustrating access to component 530. To remove cover 520, cover 520 slides away from the end of device body 510 to a second position 570. This removes the cover 520 from the portion of the device body 510 above component 530 and opens a second access route 550 for signals to reach component 530 through the device body 510. In this configuration, component 530 is located in the bottom portion of the folded device 500 and continues to transmit/receive signals in the same direction, same working direction, as when operating in the open configuration. To further facilitate component 530 accessing signals through a portion of device body 510 in the folded configuration, the end of the device body 510 opposite the end comprising component 530 can be designed for minimal internal circuitry to reduce interference with access to component 530. The opposing end of device body 510 can also comprise conductive or transparent materials to enhance access to component 530 in the folded configuration. The sliding of flexible cover 520 to expose the portion of device body 510 above component 530 in the folded position provides access to component 530 thereby enabling component 530 to function when device 500 is in the closed, folded position.

Figure 6A:
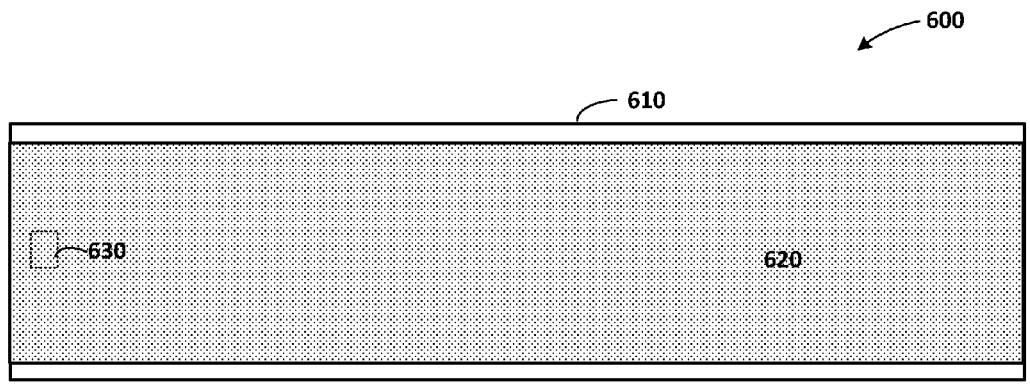
FIG. 6A is top view of a mobile device in an unfolded position, according to example embodiments.

FIGS. 6A-D illustrate a foldable mobile device 600 in accordance with various embodiments. FIG. 6A is a top view of the mobile device 600 in an open configuration. The device 600 includes a device body 610 and a flexible cover 620. The device body 610 also contains a component 630 at one end of the device 600.

Figure 6B:
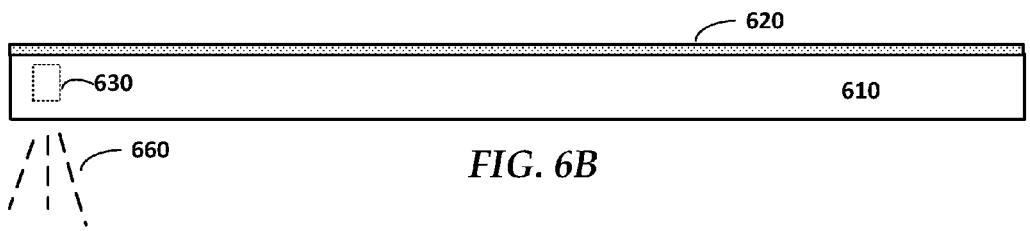
FIG. 6B is side view of a mobile device in an unfolded position, according to example embodiments.

FIG. 6B shows a side view of the mobile device 600 of FIG. 6A, also in the open position. In certain embodiments, the user interface surface of device 600 is the cover 620—cover 620 is also a user interface. For example, cover 620 can be a display and/or a touchscreen. As a touchscreen or display, cover 620 includes layers of conductive material that does not allow light, or other electromagnetic signals to penetrate. Thus, functionality of component 630 is facilitated through the opposing side of device 600 to provide a first signal access route 660. The working direction of component 630 is away from cover 620.

Figure 6C:
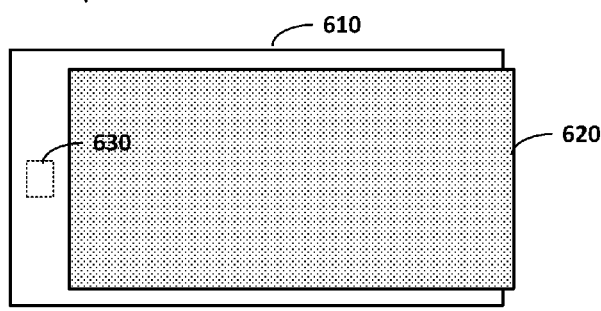
FIG. 6C is top view of a mobile device in a folded position, according to example embodiments.

Similar to FIG. 6A, FIG. 6C illustrates a top view of the mobile device 600, although in a closed (folded) configuration. The closed configuration involves folding mobile device 600. As discussed above device 600 can be folded using a variety of techniques and locations. In this top view, the location of component 630 is shown. To provide access, either physical access for a user or electronic access for various signals, to component 630, cover 620 is removed to expose the location of the component 630.

Figure 6D:
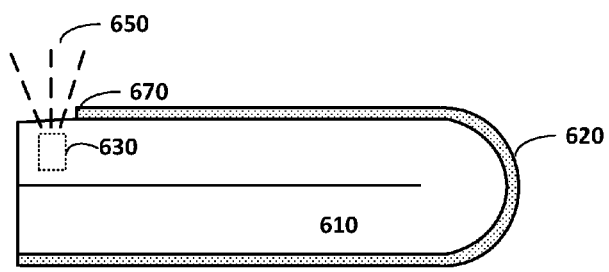
FIG. 6D is side view of a mobile device in a folded position, according to example embodiments.

FIG. 6D is a side view of the mobile device 600 of FIG. 6C in the folded configuration illustrating access to component 630. To remove cover 620 from blocking component 630, cover 620 slides away from the end of device body 610 to a second position 670. This removes the cover 620 from the portion of the device body 610 above component 630 and opens a second access route 650 for signals to reach component 630 through the device body 610. In this configuration, component 630 is located in the top portion of the folded device 600 and now transmits/receives signals from an opposing direction from that when operating in the open configuration, e.g., the working direction switches. Similar to the above discussion, device body 610 can comprise conductive or transparent materials to further facilitate second access route 650. In addition to providing access to an internal mobile device component, displacing a flexible cover can alter the functionality of the component.

Figure 7A:
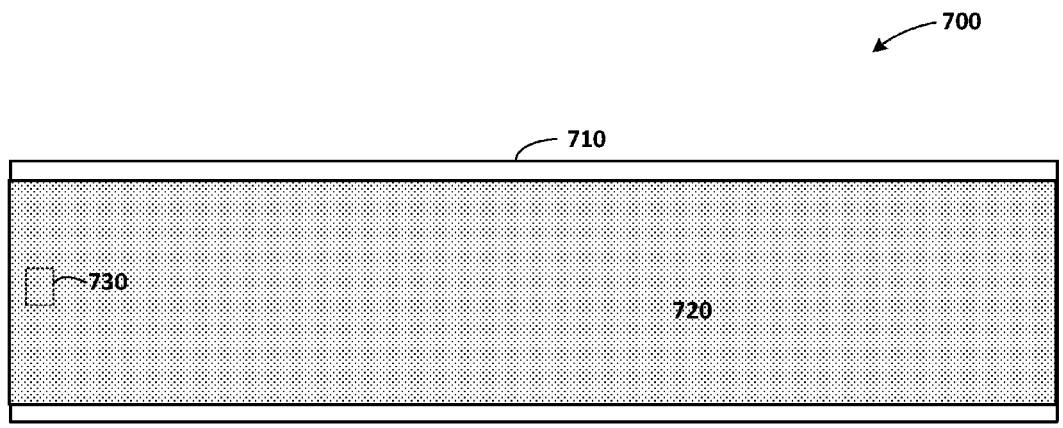
FIG. 7A is top view of a mobile device in an unfolded position, according to example embodiments.

FIGS. 7A-D illustrate a foldable mobile device 700 in accordance with various embodiments. FIG. 7A is a top view of the mobile device 700 in an open configuration. The device 700 includes a device body 710 and a flexible cover 720. The device body 710 also contains a component 730 at one end of the device 700.

Figure 7B:
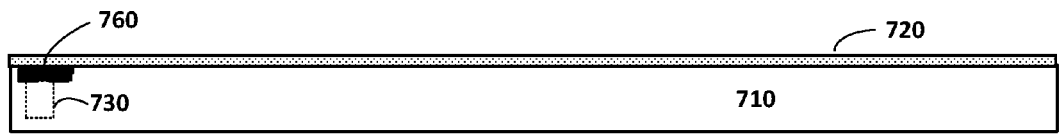
FIG. 7B is side view of a mobile device in an unfolded position, according to example embodiments.

FIG. 7B shows a side view of the mobile device 700 of FIG. 7A, also in the open position. In certain embodiments, the user interface surface of device 700 is the cover 720—cover 720 is also a user interface. For example, cover 720 can be a display and/or a touchscreen. As a touchscreen or display, cover 720 includes layers of conductive material that does not allow light, or other electromagnetic signals to penetrate. Thus, functionality of component 730 is facilitated through the opposing side of device 700.

Cover 720 is also coupled to a component accessory 760. Component accessory 760 facilitates operability of component 730. For example, if component 730 is a speaker, accessory 760 may be a plug or block to prevent acoustic signals from emanating from the blocked portion of the speaker. This would focus the sound in a preferred direction when the speaker operates in a specific device configuration (e.g., the open configuration). In another example, if the component 730 is a camera, accessory 760 may be a periscope. The periscope guides light through device body 710 to allow the camera to receive light when device 700 is in the open configuration. Alternatively, accessory 760 could include a filter or angled lens to change the operation of the camera depending upon whether device 700 is in an open or closed configuration. When in the open configuration, the component accessory 760 is also coupled to the component 730, but when the device 700 is folded, the accessory 760 is removed from the component 730.

Figure 7C:
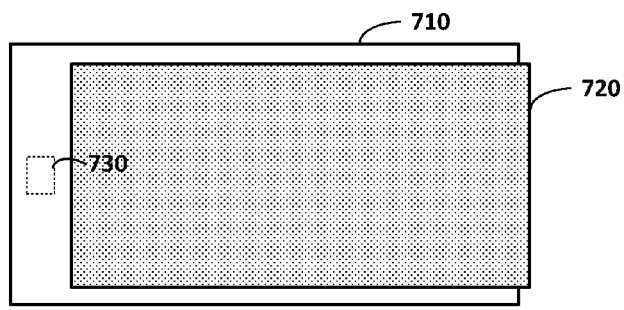
FIG. 7C is top view of a mobile device in a folded position, according to example embodiments.

Similar to FIG. 7A, FIG. 7C illustrates a top view of the mobile device 700, although in a closed (folded) configuration. The closed configuration involves folding mobile device 700. As discussed above, device 700 can be folded using a variety of techniques and locations. In this top view, the location of component 730 is shown. Removing cover 720 from above component 730 not only provides access to component 730, it also alters the operability of component 730.

Figure 7D:
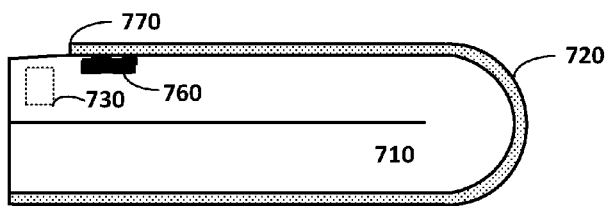
FIG. 7D is side view of a mobile device in a folded position, according to example embodiments.

FIG. 7D is a side view of the mobile device 700 of FIG. 7C in the folded configuration illustrating access to component 730. To remove cover 720, cover 720 slides away from the end of device body 710 to a second position 770. This not only removes the cover 720 from the portion of the device body 710 above component 730, it also removes component accessory 760. Using the above example of a speaker, device body 710 and cover 720 now block the previous speaker openings, so removal of the accessory plug or block allows acoustic signals to be transmitted from the opposing side of the speaker. Similarly, in the camera example, removal of the periscope/filter/lens facilitates operability of the camera from the now-exposed portion of device body 710. Since the component accessory 760 is coupled to the cover 720, it slides in concert with the cover 720. Thus, component 730 can have different modes of operation based on the configuration (open or closed) of the mobile device 700. In addition to altering the operability of a component, the closed configuration can also constitute a multi-user configuration.

Figure 8A:
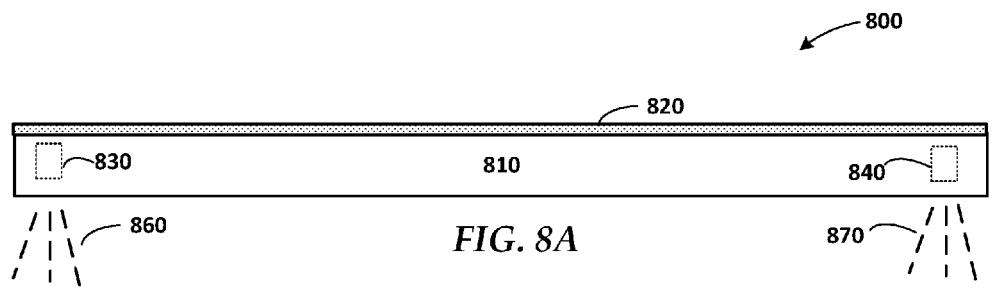
FIG. 8A is a side view of a mobile device in an unfolded position, according to example embodiments.
Figure 8B:
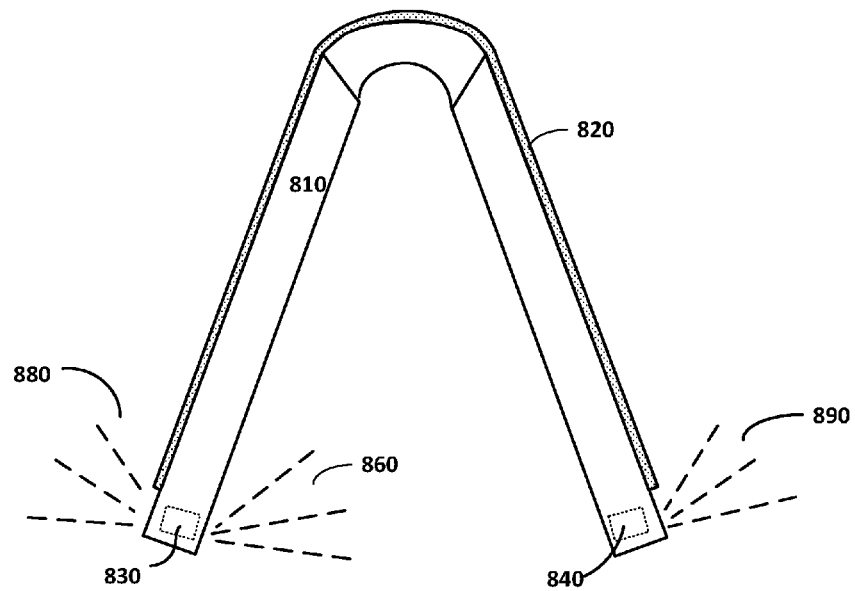
FIG. 8B is a side view of a mobile device in a folded position, according to example embodiments.

FIGS. 8A-B illustrate a foldable mobile device 800 that can be utilized by more than one user in the folded position. FIG. 8A shows a side view of the mobile device 800 in the open position. The device 800 includes a device body 810 and a flexible cover 820. The device body 810 also contains two components 830, 840 at opposing ends of the device 800. Components 830 and 840 can be the same type of component or they can be different. In certain embodiments, the user interface surface of device 800 is the cover 820—cover 820 is also a user interface. For example, cover 820 can be a display and/or a touchscreen. As a touchscreen or display, cover 820 includes layers of conductive material that do not allow light, or other electromagnetic signals to penetrate. Thus, functionality of components 830, 840 is facilitated through the opposing side of device 800. In the open configuration, each of the components 830, 840 have the same working direction 860, 870—away from the flexible cover 820.

FIG. 8B is a side view of the mobile device 800 of FIG. 8A in a folded configuration. The folded configuration of FIG. 8B allows for the device to stand on its own such that more than user can utilize the device at the same time—one user can access each side of the folded device. Cover 820 can be a continuous, flexible display, or multiple display panels connected with flexible material at folding locations. Similar to the embodiments of FIGS. 2C-D, cover 820 slides away from both ends of the device 800 to expose access to components 830 and 840. Exposure of components 830, 840 can alter the working directions of the respective components. As shown, component 830 maintains working direction 860 and adds working direction 880 so that component 830 is operable from both sides of device 800. Alternatively, component 840 switches working directions from a direction away from the cover 870, to a direction toward the cover 890. In certain embodiments, working direction 870 may be blocked with an automatically or manually placed barrier implemented for the multi-user configuration. In an example where components 830 and 840 are both speakers, the working directions can be manipulated to enhance the sound emanating from device 800 towards different users. This may be advantageous where the multiple users are engaged in a game on the same device 800. Processes for providing access to an internal component are further discussed below.

Figure 9:
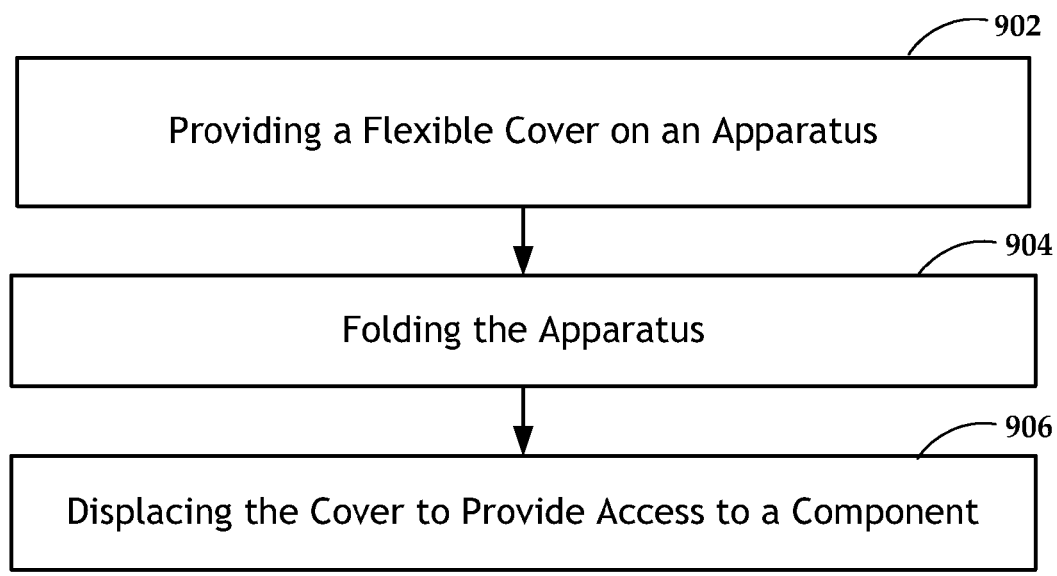
FIG. 9 is a flow chart of a method, in accordance with an example embodiment.

FIG. 9 illustrates a method for enabling operability of a mobile device component when the mobile device is in a folded configuration. The foldable mobile device includes a flexible cover 902. The cover can be an inert cover made of any type of flexible material, such as rubber or plastic, or the cover could be the device's display, such as a touchscreen. The mobile device is then folded into a closed configuration 904. As discussed above, the folded configuration involves two or more portions of the device folded adjacent each other for a more compact configuration. The closed configuration is used when the device is stored or transported. While components of the device may be operable while the device is in the closed configuration, the device is typically not being actively used by a user (e.g., minimal user interaction with exposed user interface components).

The method further includes displacing at least a portion of the cover to provide access to at least one component of the mobile device 906. Displacing the cover involves moving at least a portion of the cover from a first position on the device to a second position on the device. The moving can be any type of movement such as sliding the cover along the surface of the device or disengaging an end of the cover and reattaching it at the second position. Sliding of the cover to the second position can occur concurrently with the folding of the mobile device—the folding action pulls the slidable end of the cover to the second position due to the shorter, fixed length of the cover relative to the increased length of the device in the folded configuration. This movement of the cover exposes a surface area of the mobile device, underneath which a component is located. Removing the cover from the area enables operation of the component, for example, by allowing the component to receive electromagnetic signals such as light or radio waves. Removing the cover removes a barrier to the component. Removing the cover can also include removing a component accessory coupled to the cover. In addition, a second portion of the cover may also be displaced such that both ends of the cover move to secondary positions on the device. This can provide access to the component from both sides of the folded device.

The foregoing description of the example embodiments has been presented for the purposes of illustration and description. It is not intended to be exhaustive or to limit the embodiments to the precise form disclosed. Many modifications and variations are possible in light of the above teaching. It is intended that the scope be limited not with this detailed description, but rather, determined by the claims appended hereto.

What is claimed is:

1. An apparatus comprising:
   a foldable body comprising at least one component and a first surface; and
   a flexible cover coupled to the foldable body and covering the at least one component when in an unfolded configuration, wherein a first edge of the cover is configured to slide relative to the first surface of the foldable body from a first position on the foldable body to a second position on the foldable body while transitioning to a folded configuration to uncover the at least one component in the folded configuration.

2. The apparatus of claim 1, wherein a second edge, opposite the first edge, of the cover is configured to slide from a third position on the foldable body to a fourth position on the foldable body while transitioning to the folded configuration.

3. The apparatus of claim 1, wherein the cover at the second position exposes an access area that allows the at least one component to operate unencumbered when the body is in the folded configuration.

4. The apparatus of claim 3, wherein the exposed access area enables reception by the component of at least one of electromagnetic waves, sound waves, and light.

5. The apparatus of claim 3, wherein the exposed access area enables transmission by the component of at least one of electromagnetic waves, sound waves, and light.

6. The apparatus of claim 1, wherein the at least one component is at least one of: an antenna, a camera, an ambient light sensor, a speaker, and a microphone.

7. The apparatus of claim 1, wherein the foldable body comprises a first portion and a second portion, the second portion comprising the at least one component, and when in the folded configuration, the first portion and the second portion are adjacent each other and the first and second positions are on the first portion.

8. The apparatus of claim 1, wherein the foldable body comprises a first portion and a second portion, the first portion comprising the at least one component, and when in the folded configuration, the first portion and the second portion are adjacent each other and the first and second positions are on the first portion.

9. The apparatus of claim 1, wherein the foldable body comprises a first component at a first end and a second component at a second, opposing end and a second edge of the cover, opposite the first edge, is configured to slide from a third position on the foldable body to a fourth position on the foldable body while transitioning to the folded configuration, wherein the cover is configured to provide access to the at least two components allowing the at least two components to operate unencumbered when the body is in the folded configuration.

10. The apparatus of claim 1, wherein the at least one component has a first working direction in an unfolded configuration and switches to a second working direction in the folded configuration.

11. The apparatus of claim 10, wherein the at least one component maintains the first working direction with the second working direction in the folded configuration.

12. The apparatus of claim 1, wherein the cover is a display.

13. The apparatus of claim 1, wherein the cover is a touchscreen.

14. An apparatus comprising:
a foldable body comprising at least one component; and
a flexible display coupled to a first side of the foldable body and covering the at least one component in an unfolded configuration, wherein a first edge of the display is configured to slide relative to the first side of the foldable body from a first position on the foldable body to a second position on the foldable body while transitioning to a folded configuration to uncover the at least one component in the folded configuration, the first side of the foldable body being the exterior of the apparatus in the folded configuration, and to provide access to the at least one component to operate unencumbered when the foldable body is in the folded configuration.

15. The apparatus of claim 14, wherein the display is a touchscreen.

16. A method comprising:
providing a flexible cover on a foldable apparatus, wherein the flexible cover covers a component of the foldable apparatus when the foldable apparatus is in an unfolded configuration;
folding the apparatus to a folded configuration; and
sliding at least a first portion of the cover from a first position on the apparatus to a second position on the apparatus, wherein the first portion of the cover in the second position uncovers the at least one component and provides access to the at least one component of the apparatus.

17. The method of claim 16, further comprising sliding a second portion of the cover from a third position on the folded apparatus to a fourth position on the apparatus, wherein the second portion of the cover in the fourth position provides access to the at least one component.

18. The method of claim 16, wherein folding the apparatus and sliding the at least first portion of the cover are performed concurrently.

19. The method of claim 16, wherein sliding the at least first portion of the cover includes slidably removing a component accessory from the component.

20. The method of claim 16, wherein the cover is a touchscreen.

* * * * *